W. B. EVANS.
MEANS FOR SAVING FUEL AND PROMOTING COMBUSTION IN FURNACES AND THE LIKE.
APPLICATION FILED NOV. 28, 1913.

1,129,656.

Patented Feb. 23, 1915.

2 SHEETS—SHEET 1.

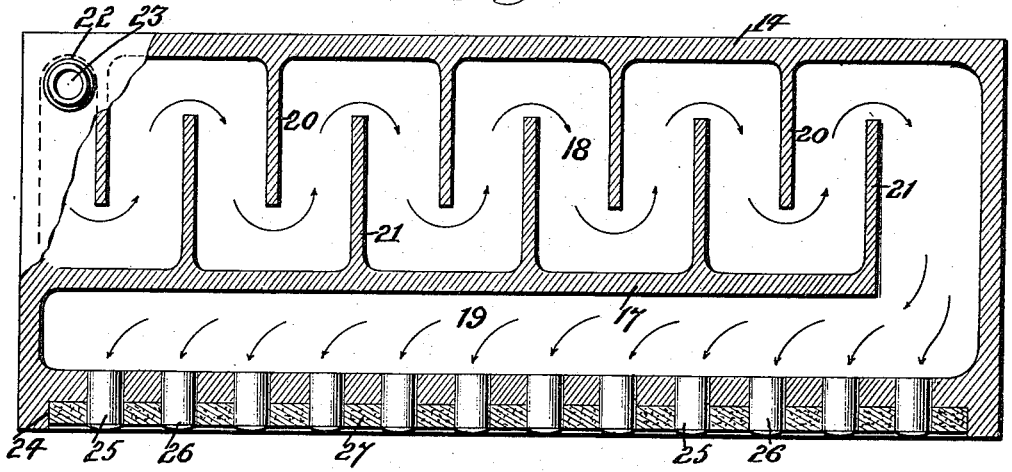
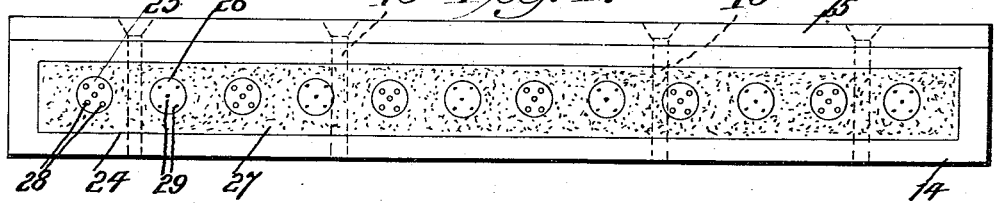
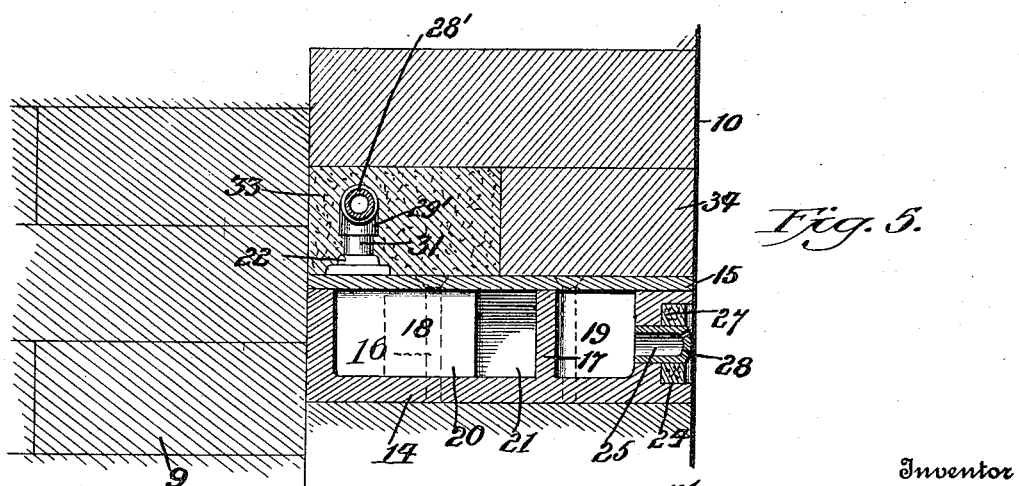

UNITED STATES PATENT OFFICE

WILLIAM B. EVANS, OF PHILADELPHIA, PENNSYLVANIA, ASSIGNOR OF ONE-HALF TO ERNEST H. GERHARDT, OF PHILADELPHIA, PENNSYLVANIA.

MEANS FOR SAVING FUEL AND PROMOTING COMBUSTION IN FURNACES AND THE LIKE.

1,129,656.   Specification of Letters Patent.   Patented Feb. 23, 1915.

Application filed November 28, 1913. Serial No. 803,496.

*To all whom it may concern:*

Be it known that I, WILLIAM B. EVANS, a citizen of the United States, residing at Philadelphia, in the county of Philadelphia and State of Pennsylvania, have invented certain new and useful Improvements in Means for Saving Fuel and Promoting Combustion in Furnaces and the like, of which the following is a specification, reference being had therein to the accompanying drawing.

This invention has relation to means for saving fuel and promoting combustion in furnaces and the like and has for its object the provision of novel means for supplying and injecting pre-heated air into a furnace at such points and in such manner and quantity as will greatly promote combustion, thereby effecting a material saving in fuel and incidently but effectively decreasing the amount of smoke emitted from the stack or chimney.

In carrying my invention into effect, I arrange air heating elements at each side of the furnace, in front of the bridge-wall and above the grate and provide such elements with air-inlet conduits extending from outside the furnace and with hot air discharging ports within the furnace, the construction and arrangement of parts being such as will be hereinafter fully described, that air drawn into the air heating elements from outside the furnace will be heated in the air heating elements and forcibly injected in substantially a horizontal direction across the fire-box of the furnace from both sides thereof, and co-mingling with the combustible gases emanating from the burning fuel, will, according to well understood principles, promote the combustion of said gases, thereby decreasing the consumption of fuel for given amounts of heat developed and, incidently but materially, decreasing the amount of unconsumed and non-utilized products of combustion ordinarily allowed to escape through the stack or chimney of the furnace.

Figure 1:
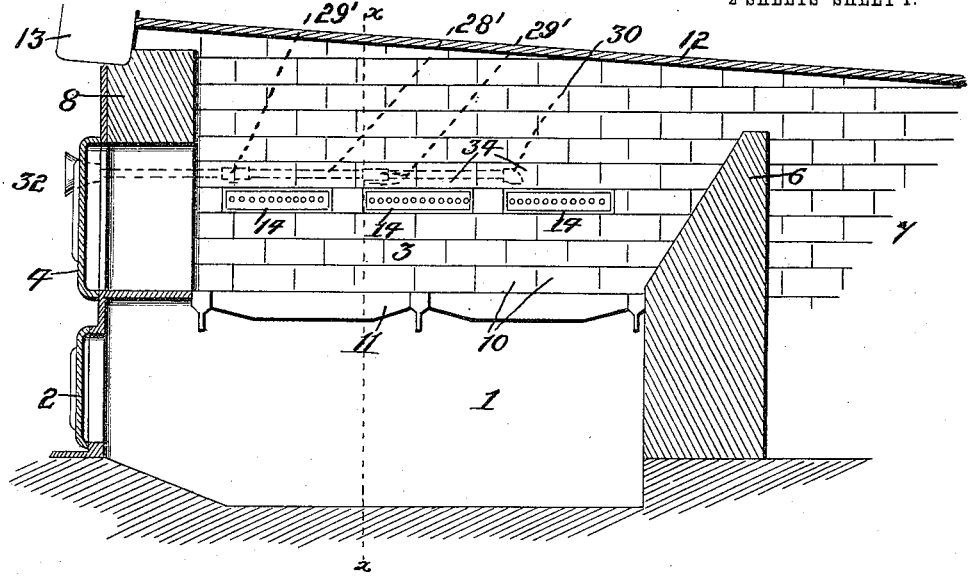
Figure 2:
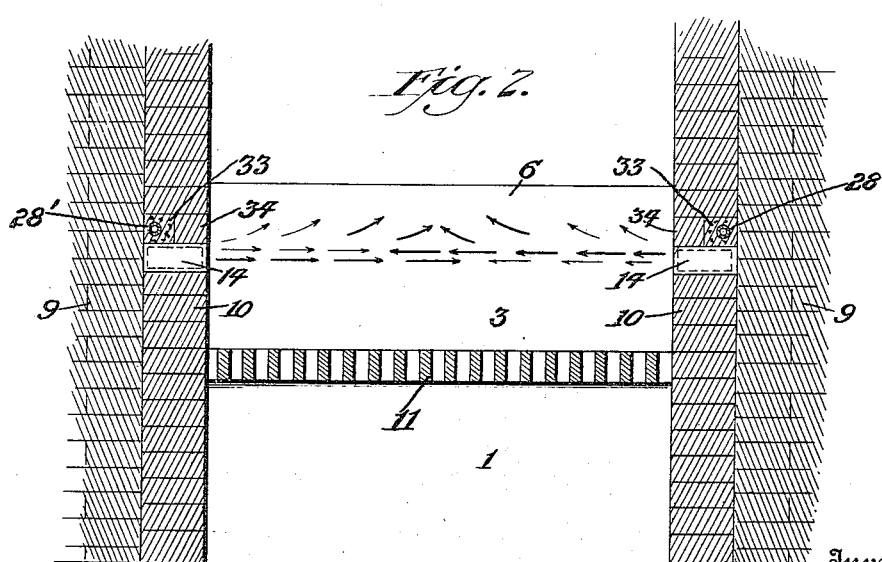

In the accompanying drawing in which I have illustrated my invention: Figure 1 is a vertical longitudinal, sectional view of a portion of a furnace, of well known type, having my improvements applied. Fig. 2 is a vertical, transverse, sectional view on the line *x*—*x* of Fig 1. Fig. 3 is a horizontal, sectional view of one of a series of air heating elements located, as shown in Figs. 1 and 2, in the side walls of the furnace. Fig. 4 is a front elevation of the air heating element shown in section in Fig. 3. Fig. 5 is a vertical, sectional view of a portion of the side wall of the furnace having the air heating element, shown in Figs. 3 and 4, in position therein, said Figs. 3, 4, and 5 being drawn to an enlarged scale from that of Figs. 1 and 2.

The furnace shown in the drawing comprises the ash-pit 1, having a door 2, the fire-box 3, having a door 4, the bridge-wall 6, and combustion chamber 7, the front wall 8, the side walls 9, lined with fire-brick 10, and a grate 11. A baffle plate 12, and a portion 13, of a boiler are also shown in Fig. 1 of the drawing to illustrate the respective positions of these parts. The furnace illustrated in the drawing and the parts of which have been designated above by numerals, is of an ordinary and well known type and while I have illustrated and will proceed to describe my invention as applied to the type shown, I wish it to be understood that my invention is applicable to many other types of furnace without material alteration or change of its construction and arrangement.

In the fire-brick lining 10, on both sides of the fire-box 3, I arrange a series of air heating elements 14, these air heating elements being of the same thickness and width as the individual fire-brick of which the lining 10 is composed, that is, approximately two and one-half inches thick by five inches wide, being preferably of this size so that a row of the air-heating elements will replace a row of the fire-brick and the air-heating elements will thus become, practically, an integral part of the fire-brick lining of the furnace.

The air-heating elements are arranged in series on a horizontal line intermediate of the top of the grate 11, and the top of the bridge-wall 6. The edges of the air heating elements are flush with the surface of the fire-brick lining and the spaces between the several elements and at the ends of the same are filled in with pieces of fire-brick, as shown, so as to preserve the continuity of the surface of the side walls of the furnace.

The construction of one of the air-heating elements employed is shown in detail in Figs. 3, 4 and 5, to which figures I will now particularly refer.

Each air-heating element is a hollow rectangular body, 14, preferably of cast iron, and having a cover 15, secured in position by bolts 16, shown in dotted lines in Figs. 4 and 5. The hollow interior of each air-heating element is formed with a longitudinally disposed vertical partition 17, which extends from one end to near the other end of the hollow interior, dividing the same into two parallel chambers, designated respectively 18, and 19. The chamber 18, which is wider than the chamber 19, is provided with vertically disposed staggered wings 20, and 21, the alternating wings 20 extending respectively from the rear wall of element 14, toward the partition 17, and the wings 21, extending from the partition 17, toward the rear wall and forming in the chamber 18, a sinuous passage beginning at one end of the chamber 18, and communicating at the opposite end with the chamber 19, and a boss 22, having an opening 23, being formed on the lid 15, for the attachment of an air pipe by means of which air is supplied to the chamber 18.

The vertical front wall of the element 14, is formed with a rectangular cavity 24, and a series of short air jet pipes, 25, and 26, are set in holes in said front wall and project through the cavity 24, their outer ends being flush with the outer surface of element 14, and the space around the jet-pipes 25, and 26, being filled in with a fire resisting cement 27.

The outer ends of the jet-pipes 25, and 26, are formed with perforations 28, and 29, respectively, the former being larger than the latter, and the jet pipes 25, and 26, alternate in position so that the air issuing from the perforations in one set of jet pipes, that is from the jet pipes having the larger perforations, will be projected farther across the furnace than the air from the other and alternating set of jet pipes, thus producing a more even and more widely distributed supply of air than if the perforations in all of the jet pipes were of the same size. This distribution of the air is illustrated in Fig. 2, where the thin, straight and curved arrows indicate the course of the air from one class of perforations, while the heavier straight and curved arrows indicate the course of the air from the other class of perforations. The provision of perforations of different size is an important feature of my invention as, otherwise, there would be danger of an uneven distribution of air over the burning fuel.

Air is simultaneously supplied to the elements 14, on each side of the furnace, by means of a main supply pipe 28', having T couplings 29' and an elbow 30 to which are connected short branch pipes 31, screwing into the openings 23, in the bosses 22, on the covers 15.

Each main supply pipe 28' projects through the front wall of the furnace and is provided with a trumpet or bell-shaped end 32.

As provision must be made for the accommodation of the air supply pipes in the firebrick lining, I remove a portion of the row of fire-brick in each side wall above the air-heating elements 14, and after the latter have been placed in position, I surround the air supply pipes with cement 33 and place a row of half-bricks 34, on top of the air heating elements and in front of the air supply pipes and thus effectually protect the air supply pipes and their connections from the direct action of the flames in the furnace.

While the air heating apparatus, above described, can, of course, be inserted in place in a furnace while the furnace is being constructed, it will be observed that the apparatus is so designed and constructed that it can be very readily and easily applied to a furnace which has been completed merely by removing a portion of two rows of the fire-brick lining on each side of the furnace for the reception of the air heating elements and their air supply pipes and by boring holes in the front wall of the furnace to receive the outwardly extending end of the main air supply pipes 28'.

In action the apparatus operates as follows: When the fire is burning the air from outside the furnace being freely admitted into the air heating elements through supply pipes 28', follows the course indicated by the arrows in Fig. 3, through chamber 18, and thence around the end of partition 17, into chamber 19, being gradually heated in its passage through these chambers by the heated walls of these chambers and is finally injected into the fire-box in substantially the form of a broad film or spray, as indicated by the thin and thick arrows in Fig. 2, and commingling with the products of combustion from the burning fuel, results in more perfect combustion than would be effected under ordinary conditions and a consequent material saving of fuel and diminution of smoke and other unconsumed products.

I claim:—

1. The combination in a furnace of a plurality of air heating elements located in the side walls thereof, the elements in each side wall being provided with an air supply pipe leading to the outside of the furnace, each element consisting of a hollow body having a central, vertical partition with lateral wings on one side dividing the hollow interior of the element into two chambers, one of which is straight and the other of which has a sinuous form, jet pipes extending from the straight chamber to the exterior of the said hollow body, said jet pipes having perforations in their outer ends, certain of said jet pipes having perforations in their outer ends of larger size than other of said jet pipes and the jet pipes having the larger and smaller perforations alternating in position in the said hollow body, said hollow body having a cavity in its front wall through which the jets project and said cavity around the jets being filled with fire resisting cement.

2. The combination with a fire-brick lined furnace, of a plurality of air heating elements located in the lining on both sides of the fire-box, the elements on each side being connected to a main air supply pipe having an inlet end external to said fire-box, each such air-heating element being composed of a hollow body having a sinuous chamber and a communicating straight chamber, jet pipes leading from one of the chambers in the interior of said hollow body to the exterior of the same, alternating jet pipes being provided with perforations in their ends of larger and smaller size respectively.

3. The combination with a fire-brick lined furnace, of a plurality of air heating elements located in the lining, on both sides of the fire box, the elements on each side being connected to a main air supply pipe having an inlet end external to said fire box, each such air heating element being composed of a hollow body having a sinuous internal chamber, a series of jet pipes leading from said chamber, alternating jet pipes being provided with perforations in their ends of larger and smaller size respectively.

4. An air heating element for furnaces, consisting of a hollow metallic block having a cavity in its front wall, a series of air jet pipes set in said front wall and extending into said cavity and a fire resisting cement filling arranged in said cavity and surrounding and protecting said jet pipes.

In testimony whereof I affix my signature in presence of two witnesses.

WILLIAM B. EVANS.

Witnesses:
 JOSEPH M. SMITH,
 MICHAEL F. MCCULLEN.